April 13, 1926.
J. W. OWEN ET AL
1,580,567
SOUND RECORD FOR TALKING MACHINES
Filed Feb. 14, 1921    3 Sheets-Sheet 1
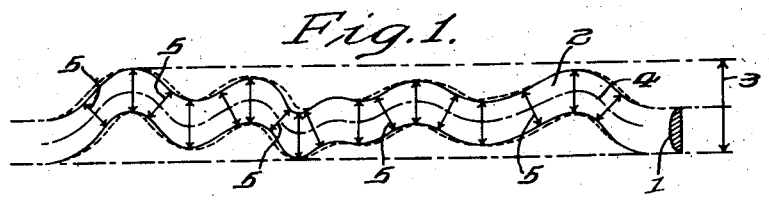
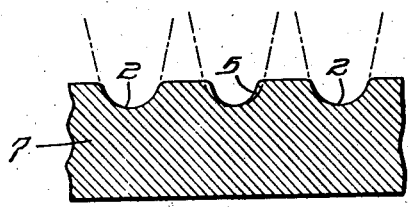
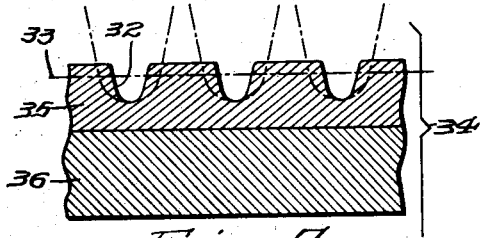
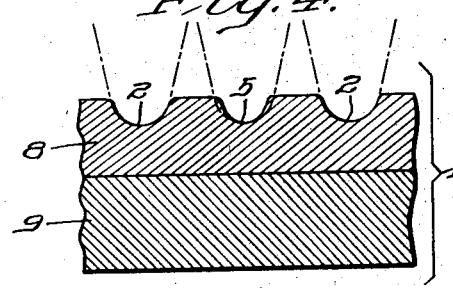
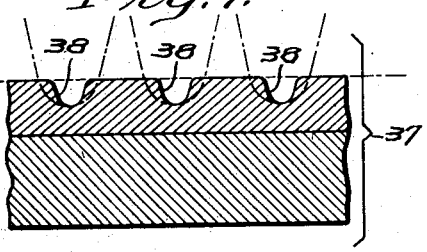
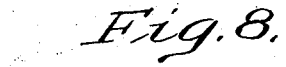
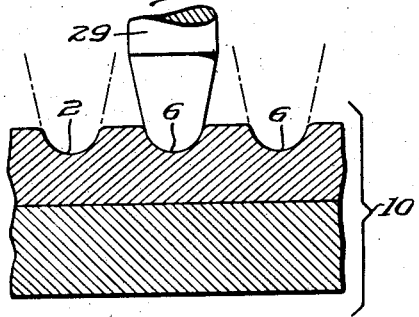
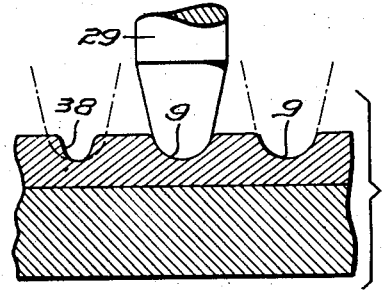
INVENTORS
James W. Owen,
Albertis Hewitt.
WITNESS
F. J. Hartman.
BY
ATTORNEYS

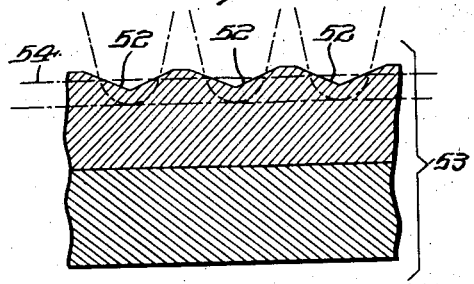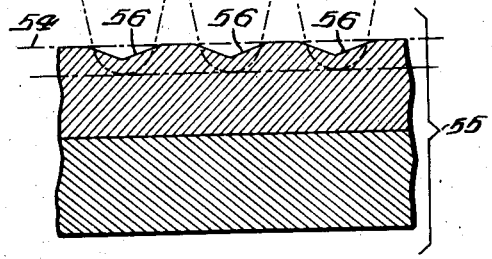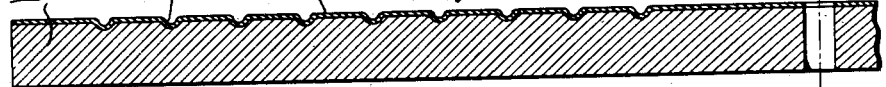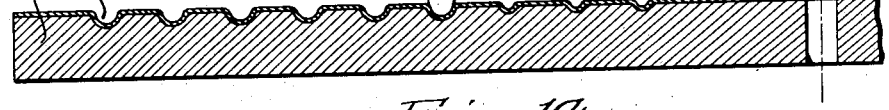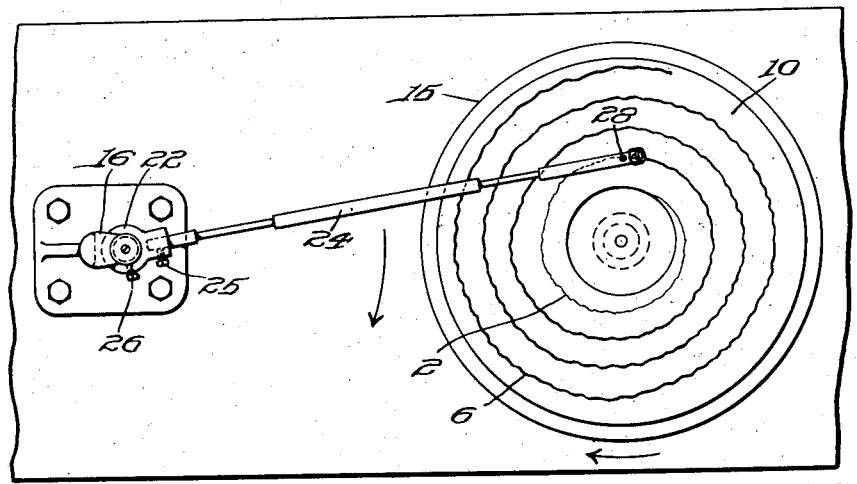

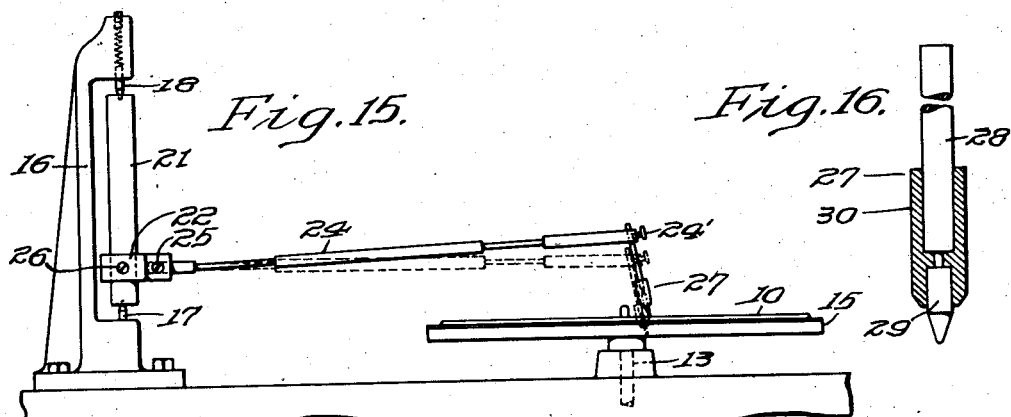
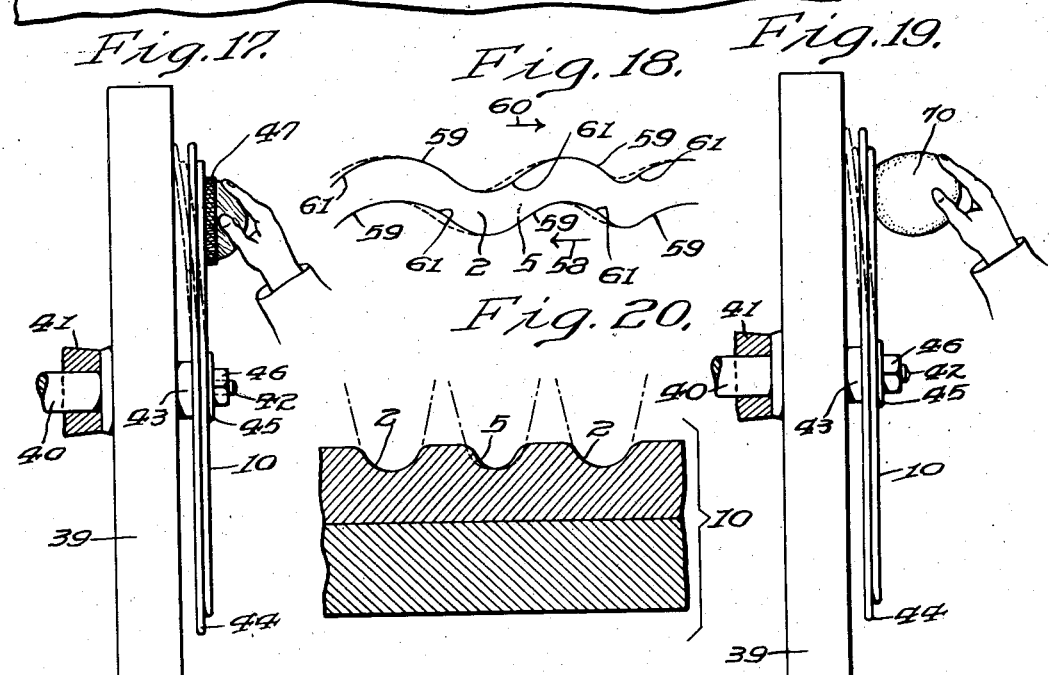
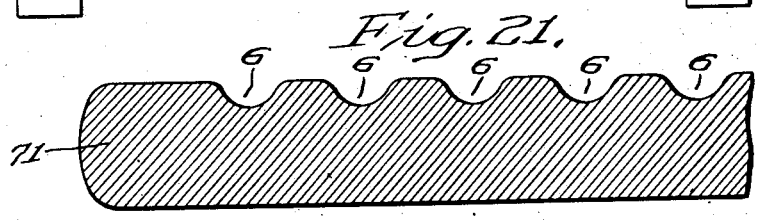

Patented Apr. 13, 1926.

1,580,567

UNITED STATES PATENT OFFICE.

JAMES W. OWEN, OF CLAYTON, AND ALBERTIS HEWITT, OF CAMDEN, NEW JERSEY, ASSIGNORS TO VICTOR TALKING MACHINE COMPANY, A CORPORATION OF NEW JERSEY.

SOUND RECORD FOR TALKING MACHINES.

Application filed February 14, 1921. Serial No. 444,796.

*To all whom it may concern:*

Be it known that we, JAMES W. OWEN and ALBERTIS HEWITT, both citizens of the United States, and residents of Clayton, in the county of Gloucester, and Camden, in the county of Camden, respectively, and the State of New Jersey, have invented certain new and useful Improvements in Sound Records for Talking Machines, of which the following is a full, complete, and exact disclosure, the subject-matter of this invention having been also disclosed in our prior application No. 877,803, filed December 17, 1914, of which the present application is a continuation in part.

The present invention relates to sound record tablets used in connection with sound reproducing machines or talking machines, and particularly relates to the sound record groove therein provided with undulations corresponding to sound vibrations. Inasmuch as the record and record groove may be produced in a variety of ways differing, however, from the manner in which sound records have previously been made, the relation which exists between the processes by the practice of which the present invention is made and those by which sound record tablets have heretofore been commonly made will be clearly set forth.

When a sound record tablet is cut or engraved in a wax tablet in a well known manner, the sound record groove may vary slightly in width when measured at right angles to the general direction of the groove, and while this peculiarity or characteristic may not be a serious objection, and may not interfere with the reproduction of sound from certain records, it is nevertheless desirable, in some instances, to eliminate this peculiarity. A cutting stylus, when vibrating rapidly and widely in a direction transverse to the general direction of the groove being formed thereby, may produce a groove which is narrower in certain portions thereof than in others, such narrow portions being where the vibrations are frequent and of relatively great amplitude. In reproducing sound from a tablet having a groove of such variable width, a reproducing stylus might tend to jam or wedge in the narrow portions of the groove and consequently tend to rise up from the bottom of the groove in such narrow portions and ride upon the side walls of the groove. Such an action of the reproducing stylus might tend to unduly wear or scratch the groove and injure the record of sound at such points. One of the objects of the present invention is to provide a record of sound, the groove of which does not have the peculiarities above referred to.

The quality of the sound which may be produced from a sound record tablet may vary with the shape of the groove in cross section and with the depth of the groove. Inasmuch as sound record tablets are made in widely different parts of the world by different individuals on different recording machines equipped with different cutting or engraving styli, the grooves of record tablets vary considerably in width, shape and depth. The grooves of some tablets are too shallow and others are too deep to produce the best reproduction of sound. The sound reproducible from a given sound record tablet might therefore be greatly improved if the groove were deeper in some cases or more shallow in other cases, or if the angle which the walls of the groove make with each other were changed from that present in a given record. The present invention has for one of its objects the production of a record having a groove therein of the best form, shape or depth for reproduction of sound therefrom, such record being produced or made from a sound record tablet having a groove of different shape or proportion.

Another object of this invention is to make a record in which the sound record groove is of a standard shape and size, so that whatever may be the depth, shape or form of the groove originally recorded, the commercial record grooves may have substantially the same shape in cross section, the same depth and the same width transverse to the median line of the groove at every point throughout the length of the grooves.

When commercial sound records, produced under the widely varying conditions above indicated, are placed upon a reproducing machine to reproduce sound therefrom, a reproducing needle or stylus of substantially fixed or standard size may or may not fit perfectly within the groove of such record. When the stylus does not properly fit the groove, its action is first that of being ground and shaped by the abrasive action of the record until it conforms to the shape of the groove. This failure of a stylus to fit the groove tends to injure the walls of the sound record groove, especially when the stylus is hard and wear resisting. A further object of this invention is to produce a record in which the sound record groove is standardized so that a standard commercial reproducing stylus will perfectly fit the sound record groove.

The volume of sound reproducible from a sound record may also vary somewhat with the form and shape of the sound record groove. Our invention relates to the production of a record in which the sound record groove is different from that formed in the recording thereof, so that the record which gives too loud a reproduction may be made to give a softer one, or a record which gives too thin or soft a reproduction, may be changed by varying the walls of the groove so as to be capable of reproducing sound with greater volume, all without detracting from the quality of the tones reproduced in other respects.

A further object of our invention is to produce a metallic sound record tablet, the walls of the groove of which are wrought and highly burnished, and polished in order that a commercial record produced therefrom shall have equally smooth burnished walls to reduce the abrasive action and scratch between the stylus and the walls of the groove. A commercial record so made with highly burnished or polished walls may be operated a greater number of times without injury to the record tablet than one in which the groove is not so burnished. An object of the invention is therefore to produce a commercial tablet from which sound may be reproduced a greater number of times than it can from an ordinary tablet without substantial injury to the walls of the groove.

Other objects of our invention will appear in the specification and claims below.

Referring now to the drawings forming a part of this specification, Figure 1 is a greatly enlarged diagrammatic plan view of a sound record groove having undulations corresponding to sound waves in the side walls thereof. In full lines is indicated such a groove as might be formed by a cutting tool 1 in a wax or other suitable tablet when the stylus is vibrated rapidly under the influence of sound waves of relatively great amplitude, while in dotted lines is indicated in diagrammatic manner the extent to which portions of the cut sound groove may be narrower than other portions as the edge of the cutting stylus vibrates in forming the groove.

Figure 2 is a view on the same enlarged scale as Figure 1 of a sound record groove such as may be produced from the sound record groove shown in Fig. 1 and which is formed in a tablet embodying our invention. The sound record groove of Figure 2 is of substantially uniform width at any point when measured at right angles to the median line of the groove.

Figure 3 shows on a greatly enlarged scale, a section of a portion of a master record, showing three consecutive convolutions of a sound record groove in transverse cross-section, the middle groove being narrower in width than it is in the adjacent convolutions.

Figure 4 indicates a metallic record, a duplicate of the record shown in Fig. 3, but stiffened by a metallic backing.

Figure 5 is a diagrammatic showing indicating the manner in which the groove of Figs. 3 and 4 is widened in its narrow portion by the passage therethrough of a spinning stylus or a metal spinning tool of hard unwearing material.

Figure 6 shows a metallic record similar to that shown in Fig. 4, but in which the groove is a duplicate of a groove in a sound record tablet which is too deep and the side walls are too nearly parallel to give a good reproduction of sound and Figs. 7 and 8 indicate the manner in which such a groove is wrought into one of standard size and shape.

Figure 9 is a diagrammatic view of another metallic record similar to that shown in Figures 4 and 6, but in which the sound record groove as originally recorded is too shallow and the side walls thereof make too great an angle with each other and Figure 10 shows how that metal record is first lapped and prepared for the travel or traverse therethrough of a spinning stylus to produce therefrom a groove of standard shape and size such as is indicated in Figures 5 and 8.

Figures 11, 12 and 13 indicate diagrammatically another method whereby the sound record groove in a metallic tablet and which is too shallow and narrow to be used from which to produce duplicate commercial records capable of being reproduced on ordinary talking machines may be changed by spinning out the groove to one of standard size and shape. The sound record groove in this instance may be a groove originally formed in any desired manner and just deep enough to guide the spinning stylus and cause it to follow the undulations corresponding to sound waves in the walls thereof during the forming or spinning or expanding of the standard sized groove therein.

Figure 14 is a plan view of one form of apparatus for spinning out the walls of a metallic sound record to change the groove therein from an undesirable groove for sound reproducing purposes to a groove of standard size and shape.

Figure 15 is a side elevational view of the apparatus shown in Figure 14, it being understood that in these last two mentioned figures any suitable motor mechanism may be employed to slowly rotate the turntable upon which the metal record is supported.

Figure 16 is a greatly enlarged view of a spinning stylus, such as may be employed in forming our new and improved record.

Figures 17 and 19 show in a more or less diagrammatic manner, an apparatus which is used for brushing, polishing and burnishing the face of a metallic sound record and the side and bottom walls of the sound record groove therein, and for lapping or grinding away the flat surface of the face of a metal record when that step is desired or required, and for rounding the edges of the sound record groove to cause them to gradually merge into the top plane surface of the record. In Figure 17 the metallic record is shown as being lapped, polished and burnished by a brush carrying a suitable abrasive pressed against the surface of the metallic record.

Figure 18 indicates on a greatly enlarged scale, and in a greatly exaggerated manner how, in brushing, burnishing or polishing the face of the sound record, the inactive walls of the groove may be that portion of the groove which is most greatly affected or modified thereby.

Figure 19 is a diagrammatic indication of the way in which the edges of the groove are rounded to remove the sharp corners between the side walls of the sound record groove and the top surface of the record tablet.

Figure 20 indicates the way in which the operation indicated in Figure 19 rounds off the corners of the sound record groove in a metallic record; and Figure 21 is a fragmentary greatly enlarged cross-sectional view of a fragment of a commercial record embodying this invention and formed from the metallic records above described in any desired well known method of duplicating metallic records, as for instance by the electroplating process of making a die or pressing matrix from said metallic master records having a spun groove therein and pressing plastic material with such a die to produce commercial records.

It is to be understood that in any of the figures the showing is diagrammatic and exaggerated, in order to clearly illustrate what is being done and how the groove, comprised in the invention hereof, is produced. The fragments of sound record tablets shown in Figures 3 to 13 and 20 and 21 are shown on an exaggerated and magnified scale, and the relative proportions are not necessarily exact.

In Figure 1 is represented a cutting or engraving tool 1 and a groove 2 cut in a suitable wax tablet thereby, the cutting tool being vibrated transversely to the direction that the tablet moves under the same tool. The cutting tool 1 is attached to the stylus of a reproducing sound box (not shown) to produce a laterally undulatory groove of even depth, the side walls of which are provided with undulations corresponding to sound waves. This groove 2 formed by a cutting stylus is indicated in the wavy double line (in full lines) the extreme movement and direction of the cutting stylus 1 being indicated by the double headed arrow 3.

When the plane of the cutting edge of the stylus or tool 1, vibrated under the influence of sound waves, extends substantially transverse to the direction of the movement of the tablet thereunder, the groove 2 formed in the face of the tablet will be of constant width when measured parallel to the plane of the cutting edge of the stylus; i. e., parallel to the arrow 3, but the groove will be variable in width when measured at right angles to the median line 4 thereof. Of course, in actual practice, these variations in the width of the groove 2 are relatively small, but there may be relatively narrow or constricted portions 5, particularly where the vibrations are frequent and the amplitude great. It must be borne in mind, however, that the showing in Figures 1 and 2 is diagrammatic and exaggerated for the purpose of clearly illustrating these peculiarities which are more or less common to sound records formed by a cutting stylus.

After such a groove as is indicated in full line in Figure 1 has been formed in wax or other suitable material and constituting the master sound record tablet, and a metal record has been formed therefrom, that groove in said metal record may be wrought, altered, changed, or spun into a groove 6 in which the width is uniform when measured at right angles to the median line 4 thereof. The relation which such a changed or altered sound record groove 6 (shown in Figure 2) bears to the original sound record groove (shown in Figure 1) is indicated by the dotted lines in Figure 1. It is the purpose of this invention to produce a sound record, the groove of which is changed from such a one as is illustrated in Figure 1 into a groove such as is shown in Figure 2 without injuriously affecting the quality or characteristics of the tone originally recorded, but, on the contrary, in such a manner as to improve the quality of character thereof. The tonal characteristics, such as are represented by the undulations in the side walls of the groove 2 will remain substantially the same when altered or wrought or spun into the form illustrated in Figure 2, but the volume and the quality and the smoothness of the reproduction may be greatly improved in the altered record over what it was in the original record.

In explaining one process by the practice of which a sound record groove of the character shown in Figure 1 may be changed into that shown in Figure 2, reference will be had to Figures 3 to 5 inclusive, in which Figure 3 shows a fragment of a wax master record tablet 7, having in the face thereof three consecutive convolutions of the sound record groove 2, the middle of the three convolutions being shown as sectioned at one of the narrow portions 5 of the groove shown in Figure 1. The cross-sectional width, depth and shape of the sound record groove at its widest points may be assumed in this instance to be correct and as not requiring change or modification, thus making the only thing to be done to the grooves of this particular record to be that of changing the narrow portions of the groove into the same size and shape of the widest portion thereof when measured at right angles to the median line of the groove.

After the wax master 7 of Figure 3 has been formed in any approved manner, as by a vibrating cutting or engraving tool, the first step of the process by the practice of which our record may be made, is to form a metal record 10, the groove 2 of which is a duplicate in every respect of the sound record groove 2 in the wax master record 7. This metal duplicate may be made in any suitable manner as for instance by an electroplating process and is shown in Figure 4 as consisting of a shell 8 formed by an electroplating process and having a sound record groove 2 therein like the groove 2 in the wax master record tablet, and preferably backed by a stiff plate or disc of metal 9 in order to give rigidity to the same. The shell 8 and metal backing 9 together form a metal record 10.

After the metal record 10 has been formed, it may be desirable to subject the same to a brushing or polishing process to burnish the side and bottom walls of the sound record groove therein and to remove any slight irregularities in the walls thereof which might produce a "scratch" during the reproduction of sound therefrom. This polishing or brushing step may be performed on the apparatus illustrated in Figure 17, in which a face plate 39 mounted on the end of a shaft 40 suitably journaled in the bearing 41 is arranged to be rotated at any desired speed by any suitable driving mechanism not shown. From the front of said face plate 39, a spindle 42 projects far enough to permit of the fitting thereover of a washer 43, a flexible metal plate 44 and the metal record 10, the washer 45 and the nut 46, whereby the metal record 10 is rigidly secured to the spindle 42 and shaft 40, is spaced a short distance from the face plate 39, and is backed by the flexible metal plate 44. The shaft 40 is revolved and a suitable soft brush 47 impregnated with a suitable abrasive such as electroshine diluted with gasoline, is manually pressed against the face of the metal record 10. The shaft 40 is rotated rather rapidly and the said brush is slowly worked back and forth over the face of the metal record 10 with the result that the brush enters into the grooves of the face of the metal record and the side and bottom walls of said grooves are smoothed, burnished and polished, and any imperfections or irregularities therein which are not removable by the spinning process, to be later described, are eliminated. The shaft 40, during this process is revolved preferably in the reverse direction to that in which the record would be revolved in reproducing sound therefrom. The brush 47 with the polishing material therein, enters into the groove and highly polishes the side and bottom walls of the groove.

After having been brushed as aforesaid with electroshine, which has a slightly abrasive action upon the face of the metal record, the record may then be subjected to a further brushing step, a soft brush in this step being preferably impregnated with a much finer polishing material, such as gold rouge, and pressed against the face of the metal record to impart to the surface of the record and to the side and bottom walls of the groove therein a very high and smooth polish.

There is another result which is effected during this burnishing process just described and which is quite important. The revolving of the metal record 10 during this brushing process in the opposite direction to that in which it would be revolved to reproduce sound therefrom subjects that wall of the groove or part of the wall of the groove which is inactive during the reproduction of sound from the record to a greater wear or abrasive action than the active portion of the wall is subjected. In Figure 18 is illustrated diagrammatically a sound record groove 2 provided with a few undulations. Now if during the reproduction of sound from a record containing that groove 2 the movement of the groove with respect to the reproducing stylus is in the direction of the arrow 58, then those parts 59 of the walls of the sound record groove 2 are the parts which are active in actuating the stylus during the reproduction of sound from those particular undulations. If then the metal record 10 be rotated in the reverse direction during the polishing process above described, that is to say, in the direction of the arrow 60, the action of the brush 47 impregnated with abrasive will be most pronounced on those portions 61 of the wall of the sound record groove and they are the inactive portions of the wall of the groove. The quality and tonal characteristics of the sound record groove are therefore very slightly, if any, changed or modified by the polishing process for the brunt of the polishing will fall upon the inactive walls of the sound record groove, and if that portion of the groove be narrow or constricted as fully explained above, then the action of the burnishing brush on the groove will be that of tending to widen or enlarge the groove at the constricted or narrow portions thereof without injuriously affecting the active wall and consequently without injuriously affecting the sound reproducible from the sound record groove.

To change the groove of the metal record 10 from one of varying to one of uniform width, this metal record 10 is subjected to the action of a hard substantially unwearing stylus which is held with considerable pressure in the groove and is caused to slowly track throughout the length of the sound record groove. One apparatus for performing this operation is shown in Figures 14 and 15 in which a spindle 13 is journaled in a suitable base or standard 14, the top of which is provided with a circular turntable 15 upon which the metal record 10 may be mounted. Upon the top of the base or support 14 is a bracket 16 provided with two alined conical bearings 17 and 18.

Between the bearing points 17 and 18 is a stiff or rigid support 21, rotatable upon the bearing points 17 and 18 as centers. Extending outwardly from the support 21 is an adjustable clamp 22 provided with a socket 23 within which one end of a resilient spring rod 24 is securely held by a set screw 25. The clamp 22 may be rigidly secured at any point on the support 21 by a set screw 26. The outer end of the resilient spring rod 24 is provided with a transverse hole or opening to receive the upper end 28 of the stylus 27 secured therein by a set screw 24'.

The spinning stylus 27 preferably consists of a cylindrical shank 28, preferably of steel, a stylus tip 29, preferably a jewel, such as a sapphire or diamond, and a coupling 30 for firmly uniting said tip and said shank.

The lower end of the stylus tip 29 is preferably conical in shape, terminating at its lower end in a rounded point shaped to exactly fit into a properly formed standard sound record groove.

The spinning apparatus for re-shaping, changing, altering, working upon, burnishing and polishing the sound record groove is operated as follows. The rod 24 is normally horizontal or mounted to swing in a plane parallel to the top of a turntable 15 and the tip 29 of the stylus 27 is below the top of the metal record as indicated in dotted lines in Figure 15. The end of the rod 24 is then sprung upwardly by the operator and swung over toward the center of the turntable so that the tip 29 will rest in the outer end of the spiral groove. The pressure with which the stylus bears upon the metal record 10 will depend upon the stiffness of the rod 24 and the position to which the clamp 22 has been previously adjusted on the stiff support 21. Before the tip 29 is actually placed in the spiral groove of the metal record, the surface of the metal record is given a thin coating of lubricant, such as lard oil. The pressure with which the tip 29 engages the metal record during the operation of the device is dependent upon the kind of a change which is to be made in the sound record groove, but the tension of the rod 24 is always so adjusted as to cause the tip to bear with considerable pressure against the surface of the metal record.

After the tip 29 has been placed in the outer end of a sound record groove nearest the periphery of the tablet, the turntable and record carried thereby are slowly revolved in a clockwise direction, preferably at a speed of from two to five turns per minute, and when so operated the stylus tip 29 will traverse the groove in the same direction that a reproducing stylus would traverse a groove during the reproduction of sound from said record.

As the turntable 15 and metal record carrier thereby are thus slowly revolved, the tip 29 of the stylus will exactly track or follow in the groove of the metal record 10 until it has traversed the entire length of the sound record groove and in so doing it will faithfully follow all the minute undulations in the sides of the sound record groove. The jewel tip 29, however, will spin or spread out or stretch the metal forming the walls of the sound record groove in those places where the groove is narrower or of a different size or shape from that of the tip of the stylus itself and make all of the parts of the groove 6 so formed uniform and of a shape, in transverse cross-section, like that of the tip of the spinning stylus.

The backing 9 of the metal record 10 serves to give the metal record rigidity and prevent it from vibrating during the spinning out of the sound record groove, because any vibration or chatter of the metal record during this operation would be imparted to the walls of the groove and would produce foreign undulations in the surface of the same.

The angle which the stylus 27 makes with the plane of the top surface of the metal record 10 is preferably just as near 90° as possible, because the nearer perpendicular to the surface of the record the stylus is, the more uniform in transverse cross-section will the groove 6 ultimately be. It has been found, however, that when the stylus makes an angle of exactly 90° with the metal record, the stylus itself is liable to vibrate or chatter. It is preferable therefore to give the stylus during the spinning operation a slightly backward rake and good results are obtained when the stylus is set at an angle of from 80° to 88° to the plane of the top surface of the metal record.

In this way we produce our new and improved sound record tablet in metal and change a metal record from one having a sound record groove which is variable in width when measured at right angles to the median line thereof to one in which the sound record groove is uniform and standard in shape, size and width and in which the groove is of unvariable width throughout its length when measured at right angles to the median line therof. The groove in the metal record is thus changed from one substantially like the groove 2 of Figure 1 into one substantially like the groove 6 in Figure 2.

Referring now back to Figure 5, the tip 29 of the spinning stylus is shown as having traversed that convolution to the right of the said stylus and since the cross-sectional shape of the groove at that particular point was originally the same as that of the tip of the stylus, substantially no change was produced therein by the spinning stylus 29. The tip is shown as being in the intermediate convolution which in Figures 3 and 4 is shown to be one of the narrower portions 5 of the groove. In traversing this narrow or constricted portion, the stylus has spun out slightly the metal of the walls of the groove and is shown as making it exactly like that convolution through which the stylus has passed and like the one to the left of the position shown and through which the stylus will next pass.

But this invention is not to be construed as limited to a record in which portions only of the sound record groove have been changed, altered, wrought upon or spun. The shape and size of the groove originally recorded in a master record may be altered in other respects and throughout the length thereof as will now be described.

It may happen that the original sound record groove was not correctly made. It may not be of the desired shape or size throughout its length. Some records may be provided with grooves the side walls of which are too nearly straight or are too widely diverging to produce the best re-production of sound therefrom. Some grooves may be too deep and others too shallow. Our invention has for its purpose the production of a record first in metal with a groove exactly like the undesirable groove and then changing the groove in that metal record to one of the desired shape, form and size by mechanically acting upon the side walls and bottom of the groove by a metal working process. Our invention also embodies the commercial record tablet, a duplicate of said altered metal record adapted for use on a suitable sound reproducing machine and wherein the sound record groove is an exact duplicate of the altered groove in the metal record. The commercial record above referred to may be formed in any suitable manner from the altered metal record, as for instance, by producing a matrix of the altered metal record by an electroplating process, and backing up the shell so formed to make a die from which commercial records may be pressed in a suitable plastic record material.

Referring now to Figures 6 to 8, it still being borne in mind that the drawings on a greatly enlarged and exaggerated scale, Figure 6 shows a cross-sectional view of a fragment of a metal record similar to that shown in Figure 5 but in which the shell contains a duplicate of a sound record groove which is too deep and the walls of which are too narrow or too nearly perpendicular. This metal record is designated as 34 and the metal shell 35 is provided with the too deep and too narrow groove 32 and further with a rigid stiff metallic backing 36. For the purpose of illustration, it is assumed that the groove 32 is too deep by the distance between the top surface of the record tablet and the dot and dash line 33 and that the angle that the side walls should make with each other is that of the tip 29 of the stylus, the contour of which is also shown in dot and dash line in Figure 6. This groove 32 in this metal record 34 may also be readily changed into a record having a groove 6 (of Fig. 2) of correct and desired size, form and depth.

The face of the metal record 34 is lapped or ground down or polished away until the groove therein is of the proper or correct depth, and in the particular instance illustrated in Figure 6, the material of the face of the record should be abraded down to the dot and dash line 33.

The lapping or grinding down of the face of the metal record 34 to produce a groove 38 of the correct depth may be performed on the same apparatus as that used for the brushing or polishing step above described and as illustrated in Figure 17 except that instead of the brush 47 a yielding, substantially flat fabric pad impregnated with a suitable abrasive is used. The said pad is manually pressed against the face of the metal record 34 while the shaft 40 is rotated and the pad is slowly worked back and forth until the face of the metal record is lapped or ground and polished down to leave a sound record groove 38 of the proper depth. During this lapping operation, the metal record is preferably rotated so as to turn the record in the opposite direction in which a commercial sound record tablet, similar to the metal record 34, would be rotated to reproduce sound therefrom.

After the lapping step above described, the face of the metal record 34 is "brushed" with a soft brush impregnated with electroshine and gasoline and afterwards with a soft brush impregnated with gold rouge to produce a very high polish on the face of the record and the walls of the record groove.

After the metal record 34 has been changed in the manner above indicated into a metal record 37 (Figure 7) the latter is placed upon the turntable 15 of the apparatus shown in Figures 14 and 15 above described and the stylus 27 is caused to traverse the sound record groove and to spin the metal of the walls of the groove to make it correspond in shape and size to the tip of the said stylus 27. Figure 8 is a diagrammatic showing similar to that in Figure 5 of the stylus 29 traversing that portion of the sound record tablet 37 which is illustrated in Figure 7, the stylus being assumed to have traversed the convolution to the right thereof and to have not traversed the groove 38 to the left thereof. It is of course understood that before the stylus 29 is caused to traverse the groove in the face of the metal record 37, the surface of the record shall first have been lubricated as above described.

In Figures 9 and 10 is similarly diagrammatically shown a groove which is too shallow and too wide and the side walls of which form too great an angle with each other for the best reproduction of sound therefrom. Figure 9 is a metal record 53 similar to the metal records 10 and 36 and is assumed to have been made in any suitable way to contain in the face thereof the sound record groove 52, a duplicate of the sound record groove having the objectionable structural features referred to. This metal record 53 is first lapped as was the metal record 34 above described, so that the record groove therein is of substantially the correct width, that is to say, down to the dot and dash line 54. The face of the said metal record is then subjected to the brushing and polishing steps above described with the result that the metal record 55 having the groove 56 in the face thereof, will be produced (see Figure 10). The record 55 is then paced upon the metal spinning machine shown in Figure 15 and the groove 56 is spun by the spinning tool out into the correct or standard or predetermined size and shape in the same manner as has been above described to produce a metal record having a spun groove therein like that shown in Figures 2, 5 and 8 above described.

In Figures 11, 12 and 13 are illustrated a further modification of the process by means of which the invention of the record herein claimed may be produced.

In Figure 11 is shown a metal record 11 having a sound record groove 12 which is too small and too shallow to actuate a stylus of a commercial sound reproducing machine. This groove 12 may have been produced in any desired manner to have undulations in the side walls corresponding to sound vibrations. Inasmuch as the spinning step is carried out at a relatively slow speed such a light or shallow groove as that indicated in Figure 11 is sufficient to guide a spinning stylus and cause it to track throughout the length of the groove and spin out the groove in the manner heretofore described.

In carrying out this spinning step it is sometimes desirable to first give the surface of the metal record a thin skin or plating of metal. In Figure 12 the metal record 11 is shown as provided with a very thin layer 19 of nickel but it is to be understood that in these figures the thickness of the nickel deposit is greatly exaggerated for the sake of clearness.

After the metal record shown in Figure 12 has been made, it is then placed upon the turntable 15 of the spinning apparatus and the spinning stylus 29 is caused to track through the groove, spinning out the groove to the size, depth and shape required and producing a spun groove 6 therein, in the manner previously described in connection with the spinning of other metallic records.

It will, of course, be understood that the faces of all the metal records which are above described as having been subjected to the action of the spinning stylus to expand or stretch or work the walls of the groove into a new and different shape must of course be of a ductile metal, such as copper and the body 11 of the metal record shown in Figures 11, 12 and 13 must be of copper or some other ductile material which will yield under the action of the spinning tool and conform to the shape imposed upon it by the action of the spinning tool, and that before the spinning tool is caused to track through the grooves of any of the metallic records acted thereon, it is preferable to give the face of the metal record a thin coat of a suitable lubricant.

If by reason of the passage of the spinning stylus 27 through the groove of the metal record, the displaced metal should rise above the plane of the surface of the metal record, the surface of the metal record may thereafter again be lapped sufficiently to remove the same and to produce a polished or burnished surface. It is to be observed that after the metal records 10, 37, 55 and 11 shown in Figures 4, 7, 10 and 11 have been formed and the grooves thereof spun, the resulting metal records (Figure 5) will be all substantially alike and they will all have the type of spun groove illustrated in Figure 2. Whatever, therefore, may be the structural characteristic of the groove in the original or master record and in the metal record first produced therefrom, the groove in the final metal record may readily be made into a "standardized" groove of uniform shape, depth and width in cross-section and of uniform width throughout the length when measured at right angles to the median line thereof, and this final standardized metal record may be thereafter retained as a metal master record from which pressing matrices may be made in any of the well known methods of making such pressing matrices. The sound record groove of a commercial record 71 pressed from such a matrix will be identical in its shape, size and form with the groove 6 of the metal record 10 and will be of uniform width when measured at right angles to the median line thereof. The walls of the groove in a commercial record 71 will be duplicates of the wrought, spun, stretched, expanded, metal walls of the metal record.

The action of the spinning stylus in traversing the groove of the metal records is to slightly spin or displace the metal of the walls of the groove. The spinning also tends to burnish and polish the walls of the groove. But the brushing and burnishing of the walls of the groove is best effected by the apparatus shown in Fig. 17 and it tends to remove from the walls of the groove those minute scratches and dull places which are apt to occur in the grooves of sound record tablets, and the smooth wall so produced tend to greatly reduce the friction between the reproducing stylus and the walls of the groove. Sound record tablets having such smooth grooves have a longer life than ordinary sound record tablets made by other processes.

In explaining the relation of the metal record involving this invention with respect to records having grooves of a shape other than that shown in Fig. 2, the metal record 10 (Fig. 4) was referred to as being a duplicate of a wax master, such as is shown in Fig. 3. But it is to be understood that such metal record as is shown in Figs. 4, 6, 9 and even Fig. 11 may be obtained by any well known process from any kind of a record, thus the metal record 10 might be made from another metal record having a groove like that shown in the record 10, or it might be made from a die or matrix as distinguished from a metal record such as has been above described. Therefore in its broader aspect, the record shown in Fig. 3 may be more properly termed a primary record tablet whether it be a wax master or some other form of record tablet, or a matrix.

The tip of the spinning stylus may, of course, be of any desired shape suitable for spinning purposes, but it is preferably substantially paraboloidal. This does not mean that its generating curve is necessarily a true parabola, for in some cases, if desired, the generatrix might be an ellipse, or an arc of a circle. The depth of a sound record groove is exceedingly minute within the distance bound by the walls of the sound record groove, and within those limits the curve of the parabola or an ellipse or of a circle may so closely approach each other as to make it rather difficult to distinguish between them. When, therefore, for brevity, the shape of the tip is referred to herein as paraboloidal, it is intended to cover and include that shape which resembles or approximates that of a paraboloid, whether the generatrix be a true parabola, a true ellipse, a circle or a straight line making an angle to the axis of the stylus and provided with a smooth curve where the generatrix meets the axis.

It is to be noted that in treating the metal record by subjecting it to the lapping or grinding steps above referred to, the use of the pad with the abrasive material thereon may tend to slightly wear away, remove or round off any sharp corners which may exist at the intersection of the side walls of the sound record groove with the plane face of the metal record, but in any instance where sharp corners there exist to a marked degree, it has been found desirable to employ a separate step to positively effect the rounding off of the sharp corners where the walls of the sound record groove meet the plane surface of the face of the record.

As the preferred means for accomplishing this end, the metal record is subjected to the action of a soft or yielding pad 70, having a rounded or substantially spherical surface for engagement with the face of the metal record. This pad 70 (Fig. 19) is impregnated with any suitable abrasive material, such as electroshine, and is worked back and forth, manually, across the face of the metal record while the record is being rotated on the apparatus indicated in Figs. 17 and 19. The action of this rounded pad in removing the sharp corners, is more effective than the flat pad since the rounded surface of this soft pad or ball 70 permits the same to accommodate itself to the surface of the record and to enter, to a certain extent, the inner side walls of the groove and to bear upon and wear away the sharp corners.

The removal of the sharp corners by the step just described may be effected at any suitable time, but it preferably follows any burnishing of the groove with the brush and any lapping of the face of the metal record, if lapping is necessary, and prior to any spinning of the groove by the hard stylus. The removal of the sharp corners or edges from the metal record will remove any sharp corners in the pressing matrix subsequently made therefrom and between the face of the matrix and the side walls of the sound ridge thereof and therefore the commercial record pressed from such matrix will also be free from any sharp corners or edges where the walls of the sound record groove meet the surface of the record. The rounding or removal of the corners or edges, tends to lengthen the life of the commercial record tablet, because as the reproducing needle wears, during the reproduction of sound from a record, the surface where the walls of the sound record groove curve over and merge into the plane surface of the sound record tablet does not come into engagement with the reproducing needle and hence does not produce shoulders on the stylus which roughen and break down the walls of the groove therein.

For the purpose of illustrating this step of removing the sharp corners, Fig. 19 shows a metal record being revolved and the surface of it being subjected to the soft pad 70. In Fig. 20, the rounding over of the corners is shown as applied to the metal record 10 (Fig. 4) prior to the passage of the spinning stylus therethrough, but it should be remembered that the drawings are rather diagrammatic as distinguished from being exact in size, form and proportion and that a number of spinning and lapping operations may be required to bring a groove not of standard size or shape into a groove of what we have termed standard size and shape and that this rounding of the corners is preferably performed prior to the last lapping operation when the effect of the last spinning operation may be relatively slight, too small to accurately illustrate in these drawings. It is to be understood, however, that the last spinning operation will not destroy the rounding of the corners of the sound record groove preferably effected immediately prior to the last traverse of the spinning stylus through the groove of the metal record.

In this connection, it is to be understood that the corners of any metallic sound record groove may be similarly rounded when desired to keep the surface where the sound record groove merges into the top surface of the record away from the abrasive action of the stylus thereon, or conversely to keep the stylus away from the abrasive action of the record at this point in the commercial duplicates made therefrom and that the step of removing the sharp corners may be introduced or omitted in any particular case as occasion might require.

Having thus described our invention, what we claim and desire to protect by Letters Patent of the United States is—

1. A sound record tablet having in the surface thereof a spiral groove provided with undulations in the walls thereof corresponding to sound waves, said grooves having rounded corners at the points where the walls of said groove merge into the unrecorded portion of said tablet.

2. A sound record tablet having a groove in the face thereof provided with undulations corresponding to sound waves in the side walls thereof, said groove being of uniform width transverse to the median line of said groove and having rounded corners at the points where the side walls of the groove merge into the unrecorded portion of the surface of said record.

3. A metallic sound record having a laterally undulatory spun groove.

4. A metallic sound record having a laterally undulatory spun groove of substantially uniform depth and curved surfaces joining the walls of said groove to the surface of said record.

5. A sound record having a laterally undulatory spun groove of substantially uniform depth and of uniform width throughout the length thereof when measured transverse to the median line of said groove.

6. A record tablet having a sound record groove with undulations corresponding to sound waves in the walls thereof, said groove being spun to an even depth throughout the length thereof.

7. A record tablet having a sound record groove with undulations corresponding to sound waves in the walls thereof, said groove being spun to an even depth and constant width measured at right angles to the median line thereof throughout the length thereof.

8. A record having a sound record groove with undulations corresponding to sound waves in the side walls thereof, said groove being of even depth and the walls of said groove being spun to an even width measured at right angles to the median line thereof.

9. A record having a spun sinuous sound record groove of even depth with undulations corresponding to sound waves in the walls thereof, the surfaces of said side walls being mechanically stretched apart to form a groove of constant width measured at right angles to the median line of said groove.

10. A sound record having a laterally undulatory spun groove.

11. A record tablet having a sound record groove with undulations corresponding to sound waves in the walls thereof, said groove being spun to an even width throughout the length thereof.

In witness whereof, we have hereunto set our hands this 12th day of February, A. D. 1921.

JAMES W. OWEN.
ALBERTIS HEWITT.